(12) United States Patent
Qahouq et al.

(10) Patent No.: US 7,368,897 B2
(45) Date of Patent: May 6, 2008

(54) LOAD ADAPTIVE POWER CONVERTER

(75) Inventors: Jaber Abu Qahouq, Beaverton, OR (US); Lilly Huang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 11/246,017

(22) Filed: Oct. 7, 2005

(65) Prior Publication Data
US 2007/0080671 A1   Apr. 12, 2007

(51) Int. Cl.
    *G05F 1/40* (2006.01)
(52) U.S. Cl. ....................... 323/282; 323/283
(58) Field of Classification Search ............ 363/17–20, 363/98, 21.13, 95, 89, 97, 37; 323/222, 282; 361/18, 19, 111, 56, 58, 90
See application file for complete search history.

(56) References Cited

U.S. PATENT DOCUMENTS 6,933,711 B2 *   8/2005   Sutardja et al. ............. 323/283
6,965,502 B2 *   11/2005  Duffy et al. .................. 361/18

* cited by examiner

Primary Examiner—Rajnikant B. Patel
(74) Attorney, Agent, or Firm—Buckley, Maschoff & Talwalkar LLC (57) ABSTRACT

In some embodiments, a switching mode power converter has an input and an output. The switching mode power converter may be configured to transition between a continuous conduction mode at a first load level and a discontinuous conduction mode at a second load level, where the second load level is lower than the first load level. A control circuit may be connected to the switching mode power converter, wherein the control circuit is configured to adjust the switching frequency of the switching mode power converter during the transition between the continuous conduction mode and the discontinuous conduction mode in accordance with maintaining low voltage deviation with respect to a reference voltage. Other embodiments are disclosed and claimed.

21 Claims, 5 Drawing Sheets

LOAD ADAPTIVE POWER CONVERTER

The invention relates to a power supply. More particularly, some embodiments of the invention relate to a mode transition scheme for a load-adaptive power converter.

BACKGROUND AND RELATED ART

The power loss of a DC/DC voltage regulator (VR) or a switching mode power converter/inverter (e.g. a pulse width modulated power converter) may include three components including, for example, switching loss, conduction loss and gate driver loss. In general, in order to reduce the total power loss, the switching loss and gate driver loss are lower at a lower switching frequency. However, the ripple voltage/current may increase as the switching frequency decreases. For a particular application, tradeoffs may be made based on load demands and component parasitics. In a light load, for example during a discontinuous conduction mode (DCM), a lower switching frequency (fixed or variable) may be utilized since the switching loss may be dominant and the conduction loss may be relatively small. In a medium or heavy load, for example during a continuous conduction mode (CCM), a fixed and higher switching frequency may be applied due to increasing conduction loss, including the ripple voltage/current, with a load current.

Various techniques may utilize both DCM and CCM to improve overall efficiency. In a Mode-Hopping technique, the DC-DC Buck VR for example operates in synchronous mode at CCM (Continuous Conduction Mode) at high load demand while the inductor current does not go below zero and operates in asynchronous mode at DCM (Discontinuous Conduction Mode) when the inductor current starts approaching the zero amperes point to reduce mainly conduction losses. In a Pulse-Skipping or variable switching frequency technique the VR switching frequency is lowered as the load becomes smaller to reduce mainly switching losses and can be implemented by using hysteretic control or variable frequency PWM control.

Both of these techniques result in efficiency improvement especially at light load. A problem with both the Mode-Hopping and Pulse-Skipping technique is that the output voltage ripple may increase during a transition between the CCM and DCM operation, which in some applications may exceed a maximum supply voltage deviation required by the load and increase the equivalent series resistance (ESR) power loss.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
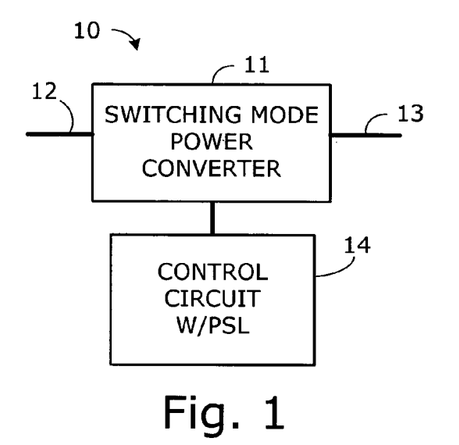
FIG. 1 is a block diagram of a load adaptive power converter according to some embodiments of the invention.

With reference to FIG. 1, a load adaptive power converter 10 includes a switching mode power converter 11 having an input 12 and an output 13. For example, the switching mode power converter 11 may be configured to transition between a continuous conduction mode at a first load level and a discontinuous conduction mode at a second load level, where the second load level is lower than the first load level. A control circuit 14 may be connected to the switching mode power converter 11. For example, the control circuit 14 may be configured to adjust the switching frequency of the switching mode power converter 11 during the transition between the continuous conduction mode and the discontinuous conduction mode in accordance with maintaining low voltage deviation between the output 13 of the switching mode power converter 11 and a reference voltage. For example, the switching mode power converter 11 may be a pulse width modulated (PWM) power converter. Adjusting the switching frequency of a switching mode power converter to maintain low ripple noise and/or voltage deviation may be referred to as a Pulse-Sliding (PSL) technique. Accordingly, control circuit 14 may be referred to as a control circuit with PSL 14.

For example, in some embodiments of the present invention, the control circuit 14 may be configured to increase the switching frequency of the switching mode power converter 11 during the transition between the continuous conduction mode and the discontinuous conduction, to be higher than a steady state switching frequency during the continuous conduction mode (e.g. to reduce ripple noise). The increase in switching frequency may be significant (e.g. at least about five percent) or even substantial (e.g. at least about twenty five percent). In some embodiments, the control circuit 14 may be further configured to decrease the switching frequency of the power converter 11 after increasing the switching frequency of the switching mode power converter 11 during the transition region between CCM and DCM and vice versa. For example, the control circuit 14 may be configured to adjust the switching frequency of the power converter 11 in a step-wise manner, linear manner, non-linear manner, piecewise manner, or in a continuously adjusted manner. This can be done for example by tracking the output ripple to maintain it within certain range when load current is around the point of CCM and DCM.

Figure 2:
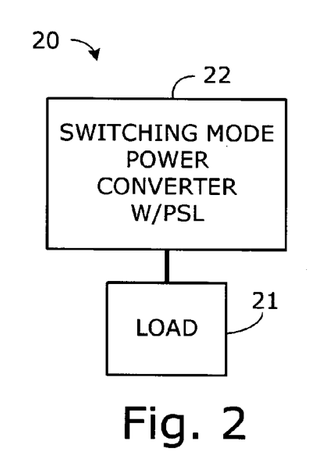
FIG. 2 is a block diagram of a system including a load adaptive power converter according to some embodiments of the invention.

With reference to FIG. 2, an electronic system 20 includes a load circuit 21 (e.g. including a processor), and a power supply unit 22 connected to the load circuit 21. The power supply unit 22 includes a switching mode power converter with PSL. For example, according to some embodiments of the present invention, the power supply unit 22 includes a switching mode power converter having an input and an output, wherein the switching mode power converter is configured to transition between a continuous conduction mode at a first load level and a discontinuous conduction mode at a second load level, where the second load level is lower than the first load level. The power supply unit 22 may further include a control circuit connected to the switching mode power converter, wherein the control circuit is configured to adjust the switching frequency of the switching mode power converter during the transition between the continuous conduction mode and the discontinuous conduction mode in accordance with maintaining low voltage deviation with respect to a reference voltage. Advantageously, high efficiency at light load may be maintained while keeping voltage ripple or deviation within specific range. For example, the switching mode power converter may be a PWM power converter.

For example, the system 20 may be a personal digital assistant (PDA), a cell phone, a portable entertainment device (e.g. an MP3 player or video player), or other mobile or handheld device powered with a battery or other energy limited source. The system 20 may also be a desktop or set top device such as for example, a personal computer (PC), an entertainment PC including an AC/DC power converter. The system 20 can also be any computing, communication, or other electronic system which utilizes a DC/DC voltage regulator.

In some embodiments of the system 20, the control circuit of the power supply unit 22 may be configured to increase the switching frequency of the switching mode power converter during the transition between the continuous conduction mode and the discontinuous conduction, to be higher than a steady state switching frequency during the continuous conduction mode (e.g. to reduce ripple noise). The increase in switching frequency may be significant (e.g. at least about five percent) or even substantial (e.g. at least about twenty five percent). In some embodiments of the system 20, the control circuit of the power supply unit 22 may be further configured to decrease the switching frequency of the switching mode power converter after increasing the switching frequency of the switching mode power converter. For example, the control circuit may be configured to adjust the switching frequency of the switching mode power converter in a step-wise or other suitable manner (e.g. a substantially continuously adjusted manner).

Without being limited to theory of operation, some embodiments of the present invention may involve a control scheme which may enable the effective and efficient transition between modes of operation for a load adaptive power converter or DC/DC voltage regulator. For the sake of power saving, different operation modes or conditions may be applied in a converter design based on the performance demands. However, even though static behavior is often well managed under each mode of operation, it is believed that ripple noise and its associated power loss during the transition between modes may be a problem in some applications.

According to some embodiments of the invention, a control circuit is configured to manage the mode transition between a continuous conduction mode (CCM) and a discontinuous conduction mode (DCM). For example, the control circuit may introduce a third mode of operation (e.g. a transition mode) with non-linear variable frequencies, or substantially increasing/decreasing the switching frequency of the PWM converter during the transition of CCM and DCM, while reducing or minimizing the power loss and significant ripple noise and/or other overshoot effects. For example, the control circuit may adjust the switching frequency during the transition between the CCM and DCM modes in order to reduce the power losses while maintaining low ripple. For example, in some embodiments this is accomplished by increasing the switching frequency at mode transition to be higher than the steady state switching frequency in CCM mode, and then decreasing it, rather than only gradually increasing or decreasing the switching frequency at the mode transition.

The ripple during the DCM operation may behave differently as compared to the ripple during the CCM operation, and the ripple may also behave differently and in a non-linear fashion at the CCM-DCM transition area. Our analysis shows that the magnitude of ripple noise may be much higher during the DCM-CCM transition if the switching frequency of a PWM converter gradually increases (e.g. linearly or in a step-wise gradual manner) to the steady state switching frequency for the CCM operation mode. Likewise, our analysis shows that the magnitude of ripple noise may be much higher during the CCM-DCM transition if the switching frequency of a PWM converter decreases gradually (e.g. linearly or in a step-wise gradual manner) to the reduced switching frequency for the DCM operation mode. In both cases, the power loss due to ripple noise may be substantial during the transition.

Figure 3:
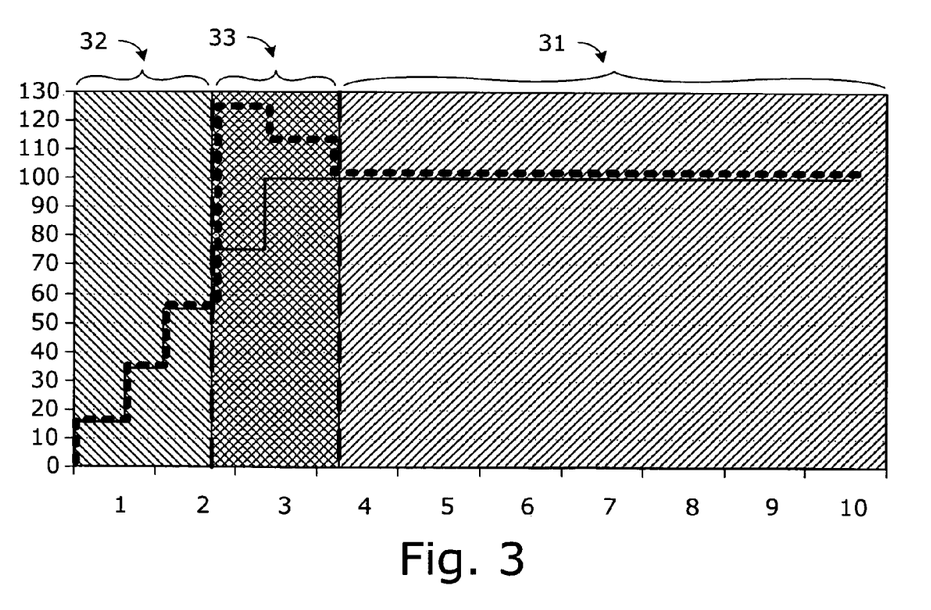
FIG. 3 is a comparison graph of switching frequency versus load current, according to some embodiments of the invention.

With reference to FIG. 3, a comparison graph compares operation of a conventional variable frequency PWM power converter against a PWM power converter with PSL, according to some embodiments of the invention. The Y-axis of the graph corresponds to a nominal switching frequency and the X-axis corresponds to a nominal load current. The thinner, solid line corresponds to the conventional operation while the thicker, dashed line corresponds to the PSL technique, according to some embodiments. With respect to the PSL technique, there are three modes of operation represented on the graph. Namely, a CCM mode 31, a DCM mode 32, and a transition mode 33. The conventional technique does not provide any special considerations during the transition mode 33, but rather simply increases or decreases the switching frequency substantially linearly (in a step-wise manner) between the DCM and CCM modes of operation.

For the illustrated PSL technique, with respect to a transition from the CCM mode 31 to the DCM mode 32, during the CCM mode 31 (e.g. at high loads) the power converter with PSL may operate at a fixed, nominal switching frequency. When the load current decreases to a point where a transition to the DCM mode 32 is indicated (e.g. for a lighter load), and depending on an amount of ripple monitored on the output, the switching frequency may initially be increased in the CCM-DCM transition region (e.g. the transition mode 33) to be higher than the steady state switching frequency of the CCM mode, to maintain low voltage deviation with respect to a reference voltage. In the transition mode 33, the ripple noise may be monitored and the switching frequency may be adjusted to maintain the ripple noise below an acceptable threshold. As the load current continues to decrease (e.g. to a very light load), the ripple noise may be reduced and the switching frequency may be decreased substantially (e.g. lower than the steady state switching frequency in CCM mode by a substantially non-linear amount).

As can be seen from FIG. 3, an initial step-wise increase in the switching frequency when transitioning from the CCM mode to the DCM mode is significant (e.g. at least five percent higher than the steady state switching frequency of the CCM mode). A second step-wise increase in the switching frequency when transitioning from the CCM mode to the DCM mode is substantial (e.g. at least twenty five percent higher than the steady state switching frequency of the CCM mode). The amount of increase and the number of steps in the increase of the switching frequency may depend on the power converter parameters and design and may also depend on the maximum allowed ripple. Increasing the switching frequency during the transition may result in some additional switching losses during the transition mode 33, but may also save conduction losses. Advantageously, the PSL technique may result in good overall efficiency with lower ripple during the transition between the DCM and CCM modes.

Figure 4:
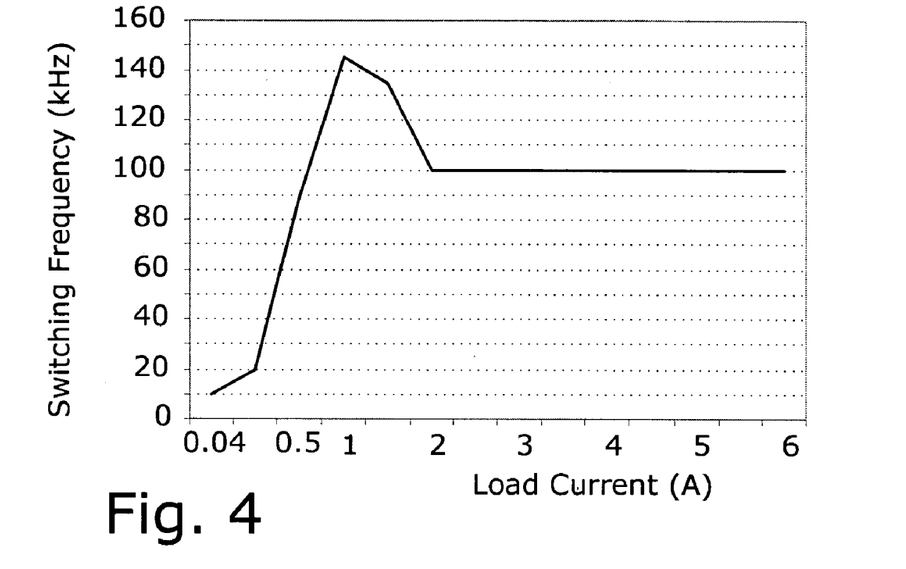
FIG. 4 is a graph of switching frequency versus load current, according to some embodiments of the invention.
Figure 5:
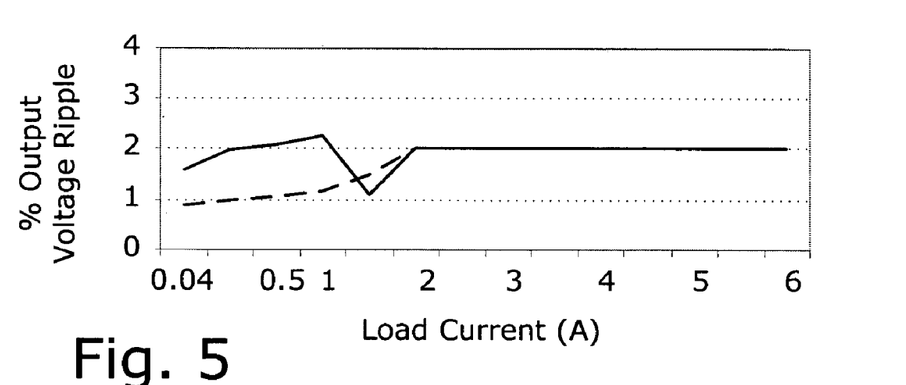
FIG. 5 is a graph of percent output voltage ripple versus load current, according to some embodiments of the invention.
Figure 6:
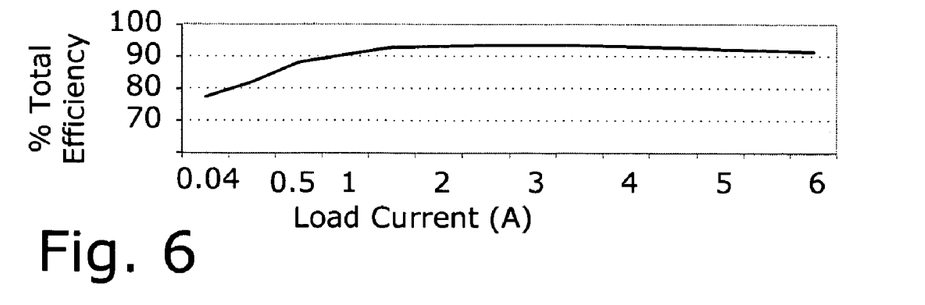
FIG. 6 is a graph of percent total efficiency versus load current, according to some embodiments of the invention.

With reference to FIGS. 4-6, simulation results confirm that adjusting the switching frequency of a PWM power converter to maintain low ripple during the transition between DCM and CCM modes provides good overall efficiency while maintaining low ripple (with reduced associated power losses). Lower ripple may be beneficial or required for some low voltage highly-integrated circuits that are sensitive to voltage ripple/deviation. FIG. 4 shows a substantially continuous adjustment between the different switching frequencies (e.g. substantially linear adjustments between the points of the graph). Advantageously, in some embodiments of a PWM power converter with PSL may maintain low ripple/deviation with no extra capacitors. Efficient operation without the extra capacitors may be important to reduce the cost and size of the circuit, especially when the voltage regulator is part of an integrated circuit.

Figure 7:
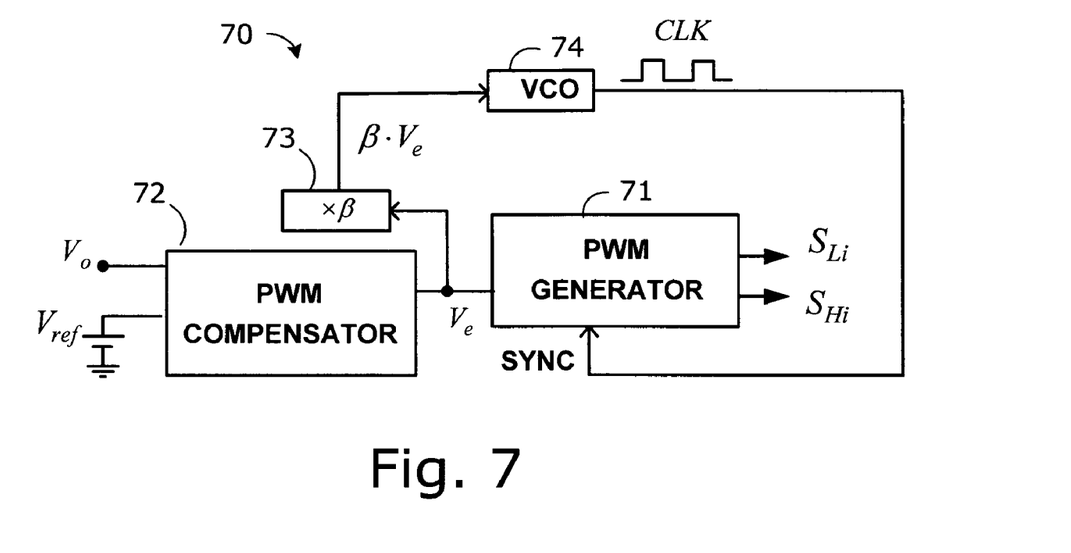
FIG. 7 is a block diagram of PWM circuit according to some embodiments of the invention.
Figure 8:
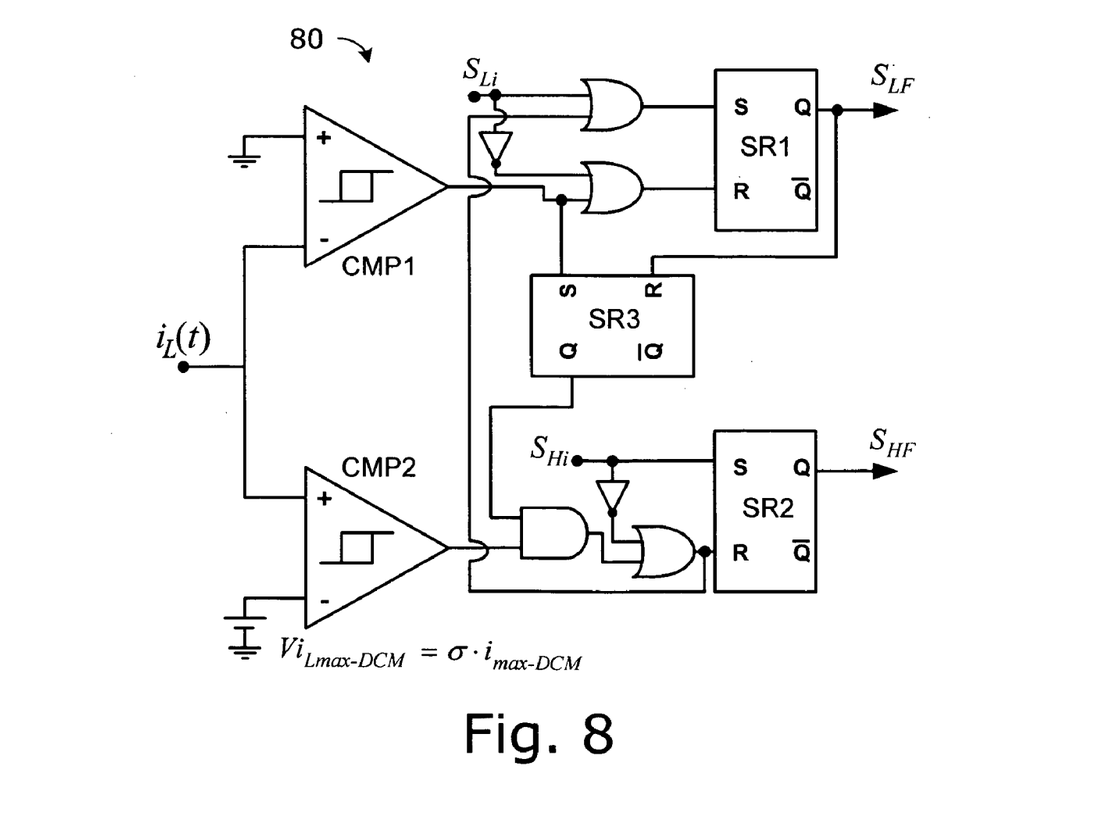
FIG. 8 is a schematic diagram of a control circuit according to some embodiments of the invention.

With reference to FIGS. 7 and 8, a non-limiting example implementation for an example PSL technique includes a PWM circuit 70 and a control circuit 80. The PWM circuit 70 includes a PWM generator 71 which provides two signals, $S_{Li}$ and $S_{Hi}$, which are synchronous complementary PWM control signals. A PWM compensator 72 receives the output voltage $V_O$ and a reference voltage $V_{REF}$ and provides an error signal $V_E$ to the PWM generator 71. A gain circuit 73 receives the error signal $V_E$ and provides a PWM compensator error signal ($\beta \cdot V_E$) to a voltage controlled oscillator (VCO) 74. The output of the VCO 74 is fed back to the PWM generator 71 as a synchronization signal (SYNC).

The signals $S_{Li}$ and $S_{Hi}$, generated by the PWM generator 71, will control the VR switching frequency in both CCM and DCM modes. The PWM generator frequency is controlled by a synchronization signal SYNC that is supplied by the input voltage of the VCO 74, which decides the switching frequency. The input voltage of the VCO 74 is controlled by voltage signal proportional to the PWM compensator error signal ($\beta \cdot V_E$). Note that $\beta \cdot V_E$ is proportional to the duty cycle, which starts with a large value at CCM-DCM transition region and drops quickly as the VR goes deeper into the DCM mode, which can be used to force a higher switching frequency in the transition mode and a lower switching frequency deeper in the DCM mode, providing improved light load efficiency while maintaining low steady-state ripple and good dynamic performance. The VCO input voltage may also be controlled by signals other than $\beta \cdot V_E$ such as the load current and voltage ripple signals to achieve the required PSL.

With reference to FIG. 8, the control circuit 80 provides two signals, $S_{LF}$ and $S_{HF}$, which are the PWM control signals that drive the power converter, for example, a buck converter VR low-side and high-side switches, respectively. The inductor current $i_L$ (t) is sensed to detect when the inductor current tries to go below zero by a comparator CMP1 that will go output high and reset the latch SR1 to force DCM mode by forcing $S_{LF}$ to go zero. The latch SR1 is set again at the next switching cycle by the OR-gate. The latch SR2 generates the high-side switch control signal $S_{HF}$. The latch SR2 is set by $S_{Hi}$ and reset by an AND gate output that will go high if both CMP2 output is high and the latch SR3 is set.

The CMP2 output will go high if the inductor current peak exceeds a pre-determined threshold (e.g. a maximum value $V_{Lmax-DCM}$) in DCM mode and the latch SR3 will be set only when CMP1 output is high, which means that the current mode is DCM. Therefore, the peak current limit will be only active in DCM mode to maintain a certain output voltage ripple. The latch SR3 will be reset each time the latch SR1 is set by $S_{Li}$ or by the AND-gate output. This is because whenever the latch SR2 is reset in DCM mode to force $S_{HF}$ to go low and prevent the inductor peak current from exceeding the limit, the latch SR1 should be set to provide a path for the inductor current.

In the DCM-CCM transition region, $V_E$ value will increase, and hence the switching frequency will increase. This is because of the fact that CMP2 will turn OFF/reset $S_{HF}$, earlier than the PWM compensator 72 commanded, to limit the inductor peak current which will result in a duty cycle that is smaller than what is needed to charge the output capacitor and maintain the output voltage and hence force the PWM compensator 72/controller 80 to increase $V_E$ to deliver larger duty cycle.

Advantageously, the PWM circuit 70 and control circuit 80 implement a PSL technique which provides a non-linear variable switching frequency which may improve the VR efficiency at lighter loads while keeping low steady-state ripple at light loads without the need to add larger output capacitance and be able to maintain good dynamic performance. Those skilled in the art will appreciate that FIGS. 7 and 8 illustrate one example of a suitable control circuit. Given the benefit of the present specification, those skilled in the art may readily construct other circuits to implement a PSL technique. Suitable PSL techniques may be implemented with discrete circuits and/or digital circuits with appropriate programming.

Figure 9:
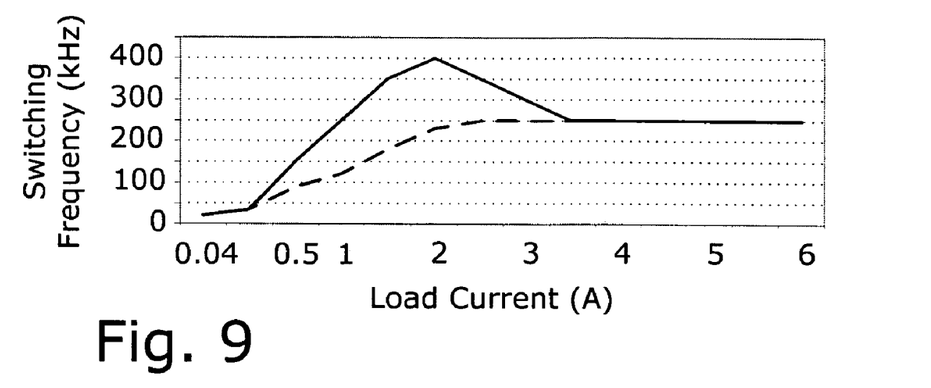
FIG. 9 is a comparison graph of switching frequency versus load current, according to some embodiments of the invention.
Figure 10:
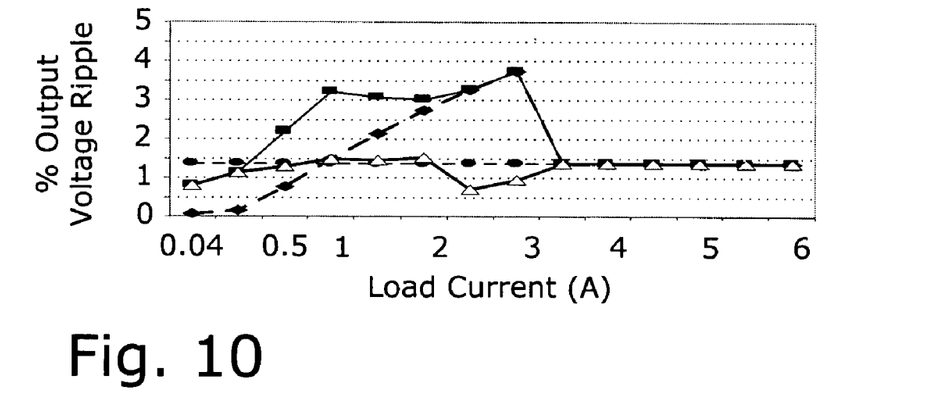
FIG. 10 is a comparison graph of percent output voltage ripple versus load current, according to some embodiments of the invention.
Figure 11:
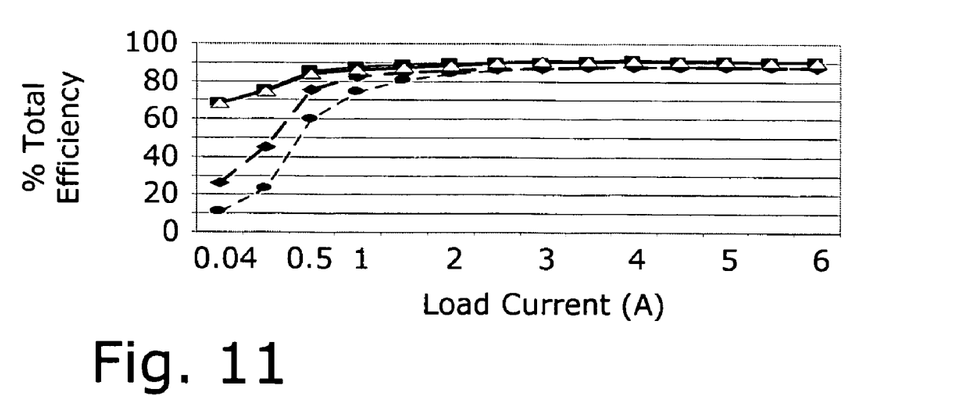
FIG. 11 is a comparison graph of percent total efficiency versus load current, according to some embodiments of the invention.

With reference to FIGS. 9-11, respective comparisons of representative results for different techniques are shown. In FIG. 9, the changes in switching frequency at different load currents are shown for a Pulse-Skipping (PS) technique (with the dashed line) and a Pulse-Sliding (PSL) technique (with the solid line). As can be seen from FIG. 9, the PS technique gradually increases/decreases the switching frequency during the transition between CCM and DCM modes, in a substantially linear manner (and never higher than the steady state switching frequency of the CCM mode). In contrast, during the transition between the CCM and DCM modes the PSL technique may increase the switching frequency higher than the steady state switching frequency of the CCM mode.

In FIG. 10, a representative percent output ripple for a CCM only technique is illustrated by the dashed line with the oval data point markers. A representative percent output ripple for an MH (Mode-Hopping) technique is illustrated by the dashed line with the diamond data point markers. A representative percent output ripple for a combined MH and PS (Pulse-Skipping) technique is illustrated by the solid line with the rectangular data point markers. A representative percent output ripple for a combined MH and PSL (Pulse-Sliding) technique, according to some embodiments of the invention, is illustrated with the solid line with the triangle data point markers. As can be seen from FIG. 10, the combined MH and PSL technique provides lower ripple content that either the MH or combined MH and PS techniques during the transition between DCM and CCM modes.

In FIG. 11, a representative percent total efficiency for a CCM only technique is illustrated by the dashed line with the oval data point markers. A representative percent total efficiency for an MH technique is illustrated by the dashed line with the diamond data point markers. A representative percent total efficiency for a combined MH and PS technique is illustrated by the solid line with the rectangular data point markers. A representative percent total efficiency for a combined MH and PSL, according to some embodiments of the invention, is illustrated with the solid line with the triangle data point markers. As can be seen from FIG. 11, the combined MH and PSL technique provides good overall efficiency (better than either the MH or CCM only techniques and about the same as the combined MH and PS techniques), even during the transition between DCM and CCM modes.

Figure 12:
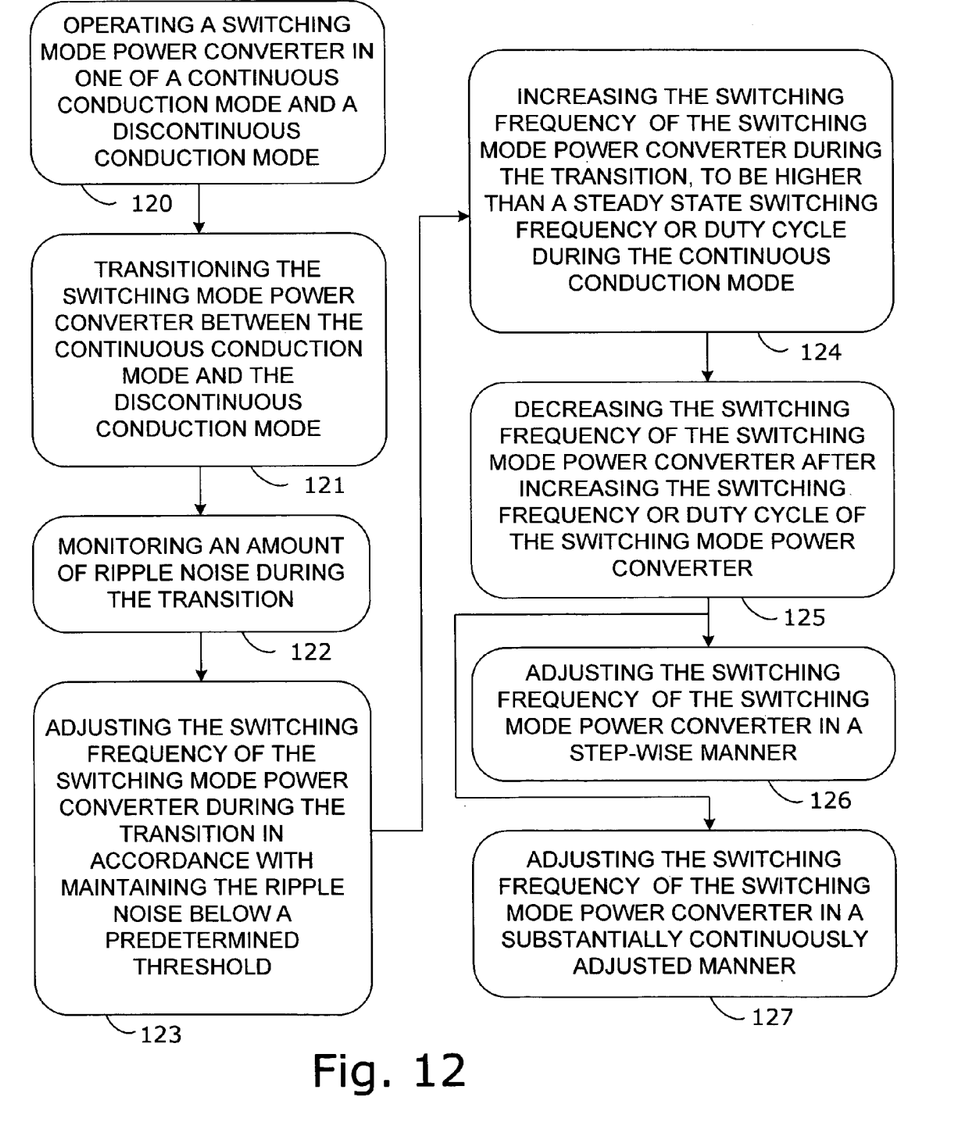
FIG. 12 is a flow diagram according to some embodiments of the invention.

With reference to FIG. 12, some embodiments of the invention involve operating a switching mode power converter in one of a continuous conduction mode and a discontinuous conduction mode (e.g. at block 120), transitioning the switching mode power converter between the continuous conduction mode and the discontinuous conduction mode (e.g. at block 121), monitoring an amount of ripple noise during the transition (e.g. at block 122), and adjusting the switching frequency of the switching mode power converter during the transition in accordance with maintaining the ripple noise below a predetermined threshold (e.g. at block 123).

In some embodiments, adjusting the switching frequency may involve increasing the switching frequency of the switching mode power converter during the transition, to be higher than a steady state switching frequency during the continuous conduction mode (e.g. at block 124). For example, the switching frequency may be significantly increased (e.g. at least five percent higher that the steady state switching frequency of the CCM mode) or substantially (e.g. at least twenty five percent higher that the steady state switching frequency of the CCM mode).

In some embodiments, adjusting the switching frequency may further involve decreasing the switching frequency of the switching mode power converter after increasing the switching frequency of the switching mode power converter (e.g. at block 125). For example, adjusting the switching frequency may involve adjusting the switching frequency of the switching mode power converter in a step-wise manner (e.g. at block 126). For example, adjusting the switching frequency may involve adjusting the switching frequency of the switching mode power converter in a substantially continuously adjusted manner (e.g. at block 127).

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. An apparatus, comprising:
a switching mode power converter having an input and an output, wherein the switching mode power converter is configured to transition between a continuous conduction mode at a first load level and a discontinuous conduction mode at a second load level, where the second load level is lower than the first load level; and
a control circuit connected to the switching mode power converter, wherein the control circuit is configured to adjust the switching frequency of the switching mode power converter during the transition between the continuous conduction mode and the discontinuous conduction mode in accordance with maintaining low voltage deviation with respect to a reference voltage, wherein the control circuit is configured to increase the switching frequency of the switching mode power converter during the transition between the continuous conduction mode and the discontinuous conduction mode, to be higher than a steady state switching frequency during the continuous conduction mode.

2. The apparatus of claim 1, wherein the switching mode power converter comprises a pulse width modulated power converter.

3. The apparatus of claim 1, wherein the control circuit is further configured to decrease the switching frequency of the switching mode power converter after increasing the switching frequency of the switching mode power converter.

4. The apparatus of claim 3, wherein the control circuit is configured to adjust the switching frequency of the switching mode power converter in a step-wise manner.

5. The apparatus of claim 3, wherein the control circuit is configured to adjust the switching frequency of the switching mode power converter in a substantially continuously adjusted manner.

6. The apparatus of claim 1, wherein the control circuit is configured to increase the switching frequency of the switching mode power converter during the transition between the continuous conduction mode and the discontinuous conduction, to be at least five percent higher than a steady state switching frequency during the continuous conduction mode.

7. The apparatus of claim 1, wherein the control circuit is configured to increase the switching frequency of the switching mode power converter during the transition between the continuous conduction mode and the discontinuous conduction, to be at least twenty five percent higher than a steady state switching frequency during the continuous conduction mode.

8. A method, comprising:
operating a switching mode power converter in one of a continuous conduction mode and a discontinuous conduction mode;

transitioning the switching mode power converter between the continuous conduction mode and the discontinuous conduction mode;

monitoring an amount of ripple noise during the transition; and adjusting the switching frequency of the switching mode power converter during the transition in accordance with maintaining the ripple noise below a predetermined threshold, wherein adjusting the switching frequency comprises increasing the switching frequency of the switching mode power converter during the transition, to be higher than a steady state switching frequency during the continuous conduction mode.

9. The method of claim 8, wherein the switching mode power converter comprises a pulse width modulated power converter.

10. The method of claim 8, wherein adjusting the switching frequency comprises:

decreasing the switching frequency of the pulse width modulated power converter after increasing the switching frequency of the pulse width modulated power converter.

11. The method of claim 8, wherein adjusting the switching frequency comprises:

adjusting the switching frequency of the switching mode power converter in a step-wise manner.

12. The method of claim 8, wherein adjusting the switching frequency comprises:

adjusting the switching frequency of the switching mode power converter in a substantially continuously adjusted manner.

13. The method of claim 8, wherein adjusting the switching frequency comprises:

increasing the switching frequency of the switching mode power converter during the transition, to be at least five percent higher than a steady state switching frequency during the continuous conduction mode.

14. The method of claim 8, wherein adjusting the switching frequency comprises:

increasing the switching frequency of the switching mode power converter during the transition, to be at least twenty five percent higher than a steady state switching frequency during the continuous conduction mode.

15. A system, comprising:

a load circuit including a processor; and a power supply unit connected to the load circuit, the power supply unit comprising:

a switching mode power converter having an input and an output, wherein the switching mode power converter is configured to transition between a continuous conduction mode at a first load level and a discontinuous conduction mode at a second load level, where the second load level is lower than the first load level; and a control circuit connected to the switching mode power converter, wherein the control circuit is configured to adjust the switching frequency of the switching mode power converter during the transition between the continuous conduction mode and the discontinuous conduction mode in accordance with maintaining low voltage deviation with respect to a reference voltage, wherein the control circuit is configured to increase the switching frequency of the switching mode power converter during the transition between the continuous conduction mode and the discontinuous conduction mode, to be higher than a steady state switching frequency during the continuous conduction mode.

16. The system of claim 15, wherein the switching mode power converter comprises a pulse width modulated power converter.

17. The system of claim 15, wherein the control circuit is further configured to decrease the switching frequency of the switching mode power converter after increasing the switching frequency of the switching mode power converter.

18. The system of claim 17, wherein the control circuit is configured to adjust the switching frequency of the switching mode power converter in a step-wise manner.

19. The system of claim 17, wherein the control circuit is configured to adjust the switching frequency of the switching mode power converter in a substantially continuously adjusted manner.

20. The system of claim 15, wherein the control circuit is configured to increase the switching frequency of the switching mode power converter during the transition between the continuous conduction mode and the discontinuous conduction, to be at least five percent higher than a steady state switching frequency during the continuous conduction mode.

21. The system of claim 15, wherein the control circuit is configured to increase the switching frequency of the switching mode power converter during the transition between the continuous conduction mode and the discontinuous conduction, to be at least twenty five percent higher than a steady state switching frequency during the continuous conduction mode.

* * * * *